United States Patent [19]

Murai et al.

[11] 4,135,871
[45] Jan. 23, 1979

[54] APPARATUS FOR MANUFACTURING RESIN TUBES ALTERNATELY HAVING A THICK WALL PORTION AND A THIN WALL PORTION

[75] Inventors: Sadao Murai, Hitakata; Takeshi Kita, Asaka; Kiyoshi Mochizuki, Joyo, all of Japan

[73] Assignee: Sekisui Kagaku Kogyo Kabushiki Kaisha, Osaka, Japan

[21] Appl. No.: 771,494

[22] Filed: Feb. 24, 1977

Related U.S. Application Data

[62] Division of Ser. No. 616,525, Sep. 24, 1975, Pat. No. 4,036,930.

[30] Foreign Application Priority Data

Sep. 24, 1975 [JP] Japan .................................. 50/110803

[51] Int. Cl.² ................................................ B29D 23/04
[52] U.S. Cl. ............................... 425/377; 425/380; 425/404; 425/465; 425/467
[58] Field of Search ............... 425/4 C, 380, 381, 466, 425/467, 377, 465, 404; 264/209, 177 R

[56] References Cited

U.S. PATENT DOCUMENTS

| | | | |
|---|---|---|---|
| 3,169,272 | 2/1965 | Maxson | 425/377 |
| 3,176,494 | 4/1965 | Cullen et al. | 425/381 X |
| 3,587,281 | 6/1971 | Lemelson | 425/465 X |
| 3,899,276 | 8/1975 | Sokolow | 425/467 X |

*Primary Examiner*—Richard B. Lazarus
*Assistant Examiner*—Mark Rosenbaum
*Attorney, Agent, or Firm*—Sughrue, Rothwell, Mion, Zinn and Macpeak

[57] ABSTRACT

Resin tubes having thick walled portions and thin walled portions are formed by providing a specially configured orifice on an extruder and varying the rate at which the extruded resin tube is pulled from the extruder. The orifice is shaped to form a thin tubular opening and a thick tubular opening communicating with one another, the thick tubular opening being adjacent and down-stream of the thin opening. When the extruded resin tube is pulled at a high speed the thin tubular opening is filled with resin that passes through but does not fill the thick tubular opening. At the slow pulling speed the resin fills at least the open-end portion of the thick tubular opening thereby forming a thick walled portion of the resin tube.

4 Claims, 14 Drawing Figures

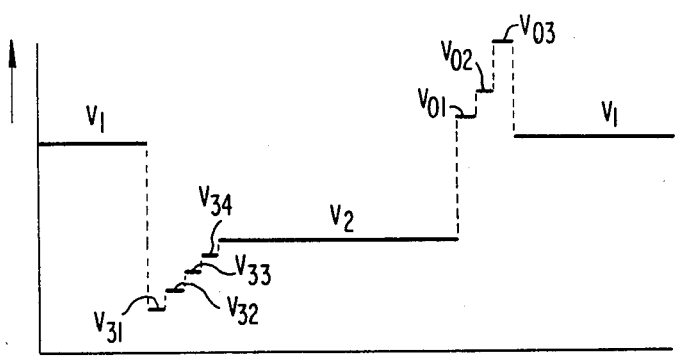
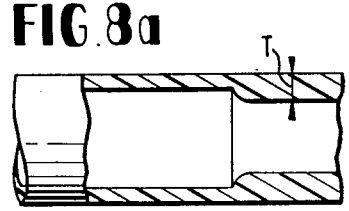
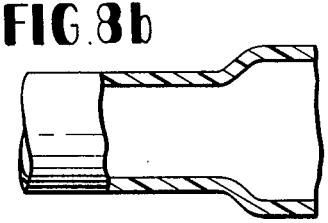
FIG.6
FIG.8a
FIG.8b
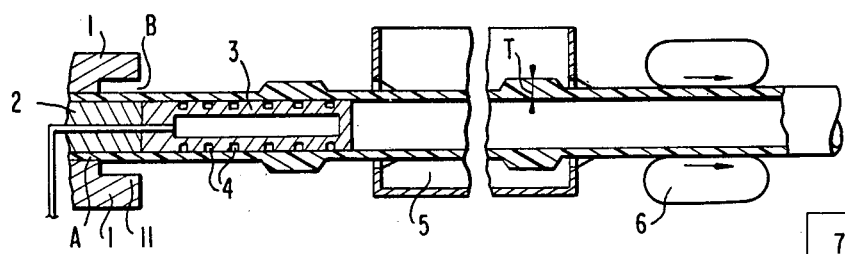
FIG.7
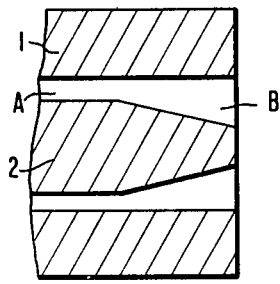
FIG.9a
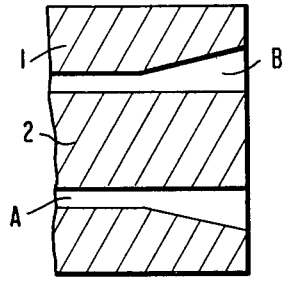
FIG.9b
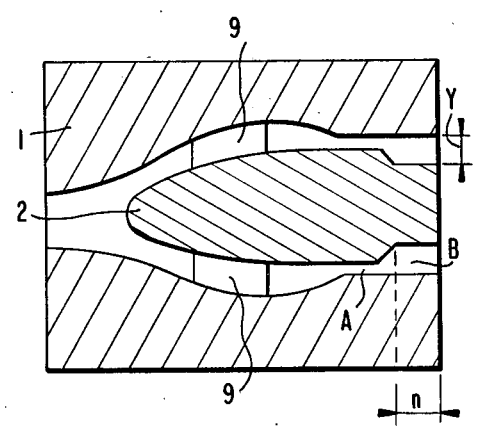
FIG.10
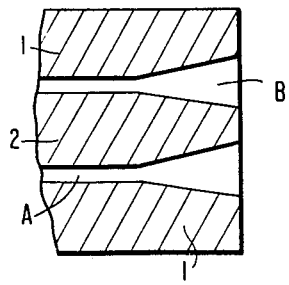
FIG.9c
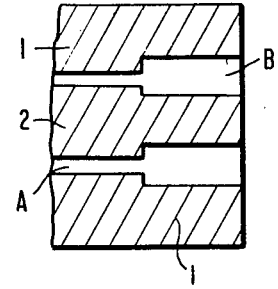
FIG.9d

APPARATUS FOR MANUFACTURING RESIN TUBES ALTERNATELY HAVING A THICK WALL PORTION AND A THIN WALL PORTION

CROSS REFERENCE TO RELATED APPLICATION

This application is a divisional of application Ser. No. 616,525, filed Sept. 24, 1975, and now U.S. Pat. No. 4,036,930.

BACKGROUND OF THE INVENTION

This invention relates to an apparatus for manufacturing resin tubes alternately having a thick wall portion and a thin wall portion.

Generally, an extrusion molding process is employed to manufacture resin tubes. This extrusion molding process comprises providing an orifice at the tip of an extruding machine, forming a tubular opening at the extreme end of the orifice, extruding resin through said opening to form it into a tubular member, and pulling or taking out the molded tubular resin to manufacture a resin tube.

Conventionally there is employed an extruding machine of the type in which one or more screws are rotated within a barrel and the molten resin is mixed while molten by the screw which is designed so as to extrude the resin at a substantially uniform speed. In such an extruding machine there is used an orifice in which an opening width is formed to be substantially uniform along the axis of flow in order to provide a contour as desired. It is therefore difficult for such apparatus to manufacture resin tubes having a thick wall portion and a thin wall portion.

Extruding machines may extrude resin at substantially a uniform speed, but strictly speaking, the extrusion speed of the extruding machines is not always constant due to various causes. In normal extrusion operation, therefore, the pulling or take-up speed has not always been made constant but has been varied responsive to variation of extrusion speeds. Taking advantage of the fact as noted above, it may readily be conceived that in normal extruding operation, the take-up speed is periodically varied to thereby alternately form a thick wall portion and a thin wall portion along the axial direction of a tube.

Japanese Patent Publication No. 24143/1974 describes an attempt to manufacture resin tubes with thick and thin wall portions in accordance with the above mentioned principles. However, satisfactory resin tubes have not been obtained with the use of orifices as disclosed in FIGS. 1 and 2 of said patent. The orifice shown in FIGS. 1 and 2 of said patent is formed with an opening corresponding to the thin wall portion of the resin tube, and the resin tube emerged from the orifice is externally controlled in its outside diameter. However the system of the latter patent results in buckling of the walls of the tube. As the tube is pulled it passes immediately into an outside diameter control device which acts to harden the external surface. However as a result of the reactive force in the axial direction caused by the pressure of the resin extruder and the force in the opposite direction caused by slowing the pulling speed, the tube will buckle. Also the physical properties of the tube are degraded by residual strain due to the different flowing speeds of the resin at the internal and external surfaces which are caused by the quick hardening of the external surface. For this reason, further improvements are necessary to manufacture resin tubes of the aforementioned kind by conventional extruding machiens as described above.

SUMMARY OF THE INVENTION

In accordance with the present invention the orifice, which is the type having an inner die forming a tubular opening, is cut off at the resin discharge end and a large-width tubular opening is provided. That is, in the orifice, the newly formed large-width tubular opening assumes a position at the tip of the opening thereby forming two stages of opening comprising a large-width opening and a small-width opening.

In forming resin tubes using the aforementioned orifice, an outside diameter control device is mounted in contact with the orifice, and the take-up speed for pulling resin tubes extruded from the orifice is varied in at least two stages comprising a high speed and a low speed. When the tube is pulled at a high speed, the resin is molded by the small-width tubular opening. That is, when the tube is pulled at a high speed, the large-width opening is not filled with resin. On the other hand, when the tube is pulled at a low speed, at least the open-end portion of the large-width opening is filled with resin, and the resin is thus molded into a tube by the large-width opening. In this manner, a resin tube has been produced in which the thick wall portion and thin wall portion thereof are alternately positioned in the lengthwise direction, said thick wall portion being in substantial registration with the large-width tubular opening, said thin wall portion being in substantial registration with the small-width tubular opening, and each of the thick wall portion and the thin wall portion having a uniform thickness, respectively.

BRIEF DESCRIPTION OF THE DRAWINGS

FIGS. 5 and 6 are graphic representations showing a preferable form of variation of the pulling speeds of the pulling machine according to the invention.

FIG. 7 is a schematic illustration in cross-section showing another embodiment of the invention.

FIGS. 8a and 8b are partially cutaway sectional views showing subsequent optional operations on a resin tube obtained by the invention.

FIGS. 9a–9d are partially cutaway sectional views of various orifices used in the invention.

FIG. 10 is a sectional view of another orifice used in the invention.

DESCRIPTION OF THE PREFERRED EMBODIMENT

Figure 1:
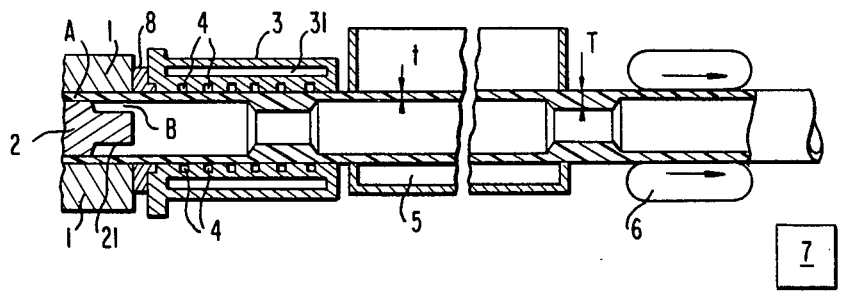
FIG. 1 is a schematic illustration in cross-section showing one embodiment of the invention.

FIG. 1 is a partially cutaway sectional view schematically illustrating the present invention. In FIG. 1, there is shown an orifice, which comprises an outer die 1 and an inner die 2, the inner die being fixedly positioned within the outer die to form a tubular opening therebetween. The inner die 2 is cut at 21 on the resin discharge side of the orifice to form two tubular openings. These two openings consist of a small-width tubular opening A and a large-width tubular opening B. The small-width opening A is positioned in the inner part of the orifice while the large-width opening B is positioned at the discharge portion of the orifice.

The outer die 1 is separated from an outside diameter control device 3 by a washer 8. The outside diameter control device 3 is cylindrical and has an inside diameter which is approximately equal to the inside diameter of outer die 1. In this way, a resin tube emerging from the orifice is passed into the device 3 without having the outer surface of the resin tube brought into contact with the atmosphere. The device 3 includes a cavity 31, through which cooling water is circulated to cool the resin tube. The device 3 also has annular grooves 4 formed in an internal surface thereof and in communication with a pressure reducing pipe through which air is discharged. This results in a partial vacuum causing the resin tube to come into close contact with the internal surface of the device 3. In this manner, the external surface of the resin tube may be controlled by the device 3.

The resin tube which emerges from device 3 enters a water vessel 5, in which cooling water is stored, so that the external surface thereof is cooled by the cooling water. The resin tube is cooled to such a degree that it maintains its shape when subsequently pulled by means of a take-up or pulling machine 6. The take-up machine 6 comprises, for example, a pair of endless belts or rollers, which pull the resin tube by holding it between the rotating belts or rollers. The rotation of the belts or rollers may suitably be adjusted by an instrument housed in a control box 7.

The rotation of the take-up machine 6 may be controlled to have at least two stages. That is, the machine 6 is, in one case, rotated in a direction as indicated by the arrow in FIG. 1 at a high speed $V_1$ and in the other case, rotated in the same direction at low speed $V_2$. The high speed $V_1$ is within a range such that the small-width tubular opening A is filled with resin within the orifice but the large-width tubular opening B is not filled. In this manner, the resin discharged through the orifice is exclusively controlled by the small-width opening A to thereby form a resin tube having a thin wall (t). On the other hand, the low speed $V_2$ is within a range such that the large-width tubular opening B is filled with resin within the orifice, or at least the open-end portion of the tubular opening B is filled therewith. In this manner, the resin discharged through the orifice is exclusively controlled by the large-width opening B to thereby form a resin tube having a thick wall (T). Thus, the rotational speed of take-up machine 6 is controlled at least in a manner of high and low stages to alternately repeat operation of high speed take-up and low speed take-up, whereby the resulting resin tube has alternately formed thin and thick wall portions.

Desired speeds for obtaining the thick and thin walled portions may be easily determined by simple trial and error, or may be easily calculated. Because of the fact that an extruding machine extrudes a substantially predetermined quantity of resin per hour and the cross-sectional area of the small-width opening A is known, a theoretical value of the high speed $V_1$ can roughly be calculated. Similarly, a theoretical value of the low speed $V_2$ may be figured out from the cross-sectional area of the large-width opening B. Accordingly, the take-up speed can simply be controlled according to the theoretical values. Alternatively, there is provided another method in which an inside diameter measuring device for the resin tube extruded is mounted at the tip of inner die in the orifice so as to detect the inside diameter of the resin tube, whereby the wall thickness of the resin tube may be checked and the take-up speed of the take-up machine 6 may also be controlled to suit the thickness as described.

Figure 2:
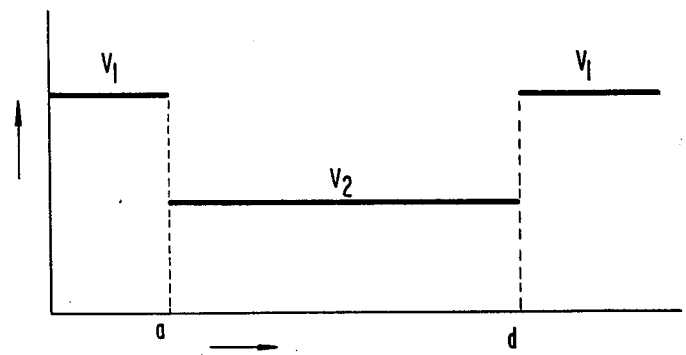
FIG. 2 is a graphic representation showing variation of the pulling speeds of a pulling machine in accordance with the invention.
Figure 3:
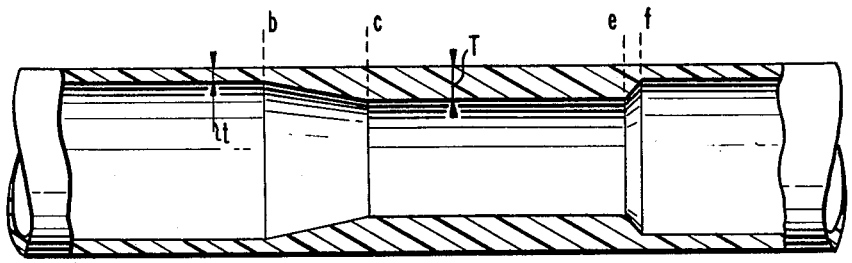
FIGS. 3 and 4 are partially cutaway cross-sectional views of a resin tube obtained in accordance with the invention.
Figure 4:
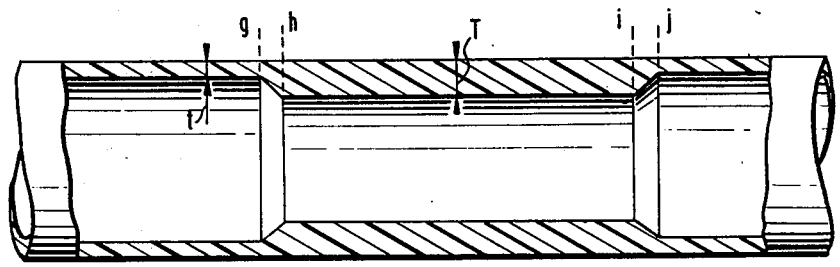
Figure 5:
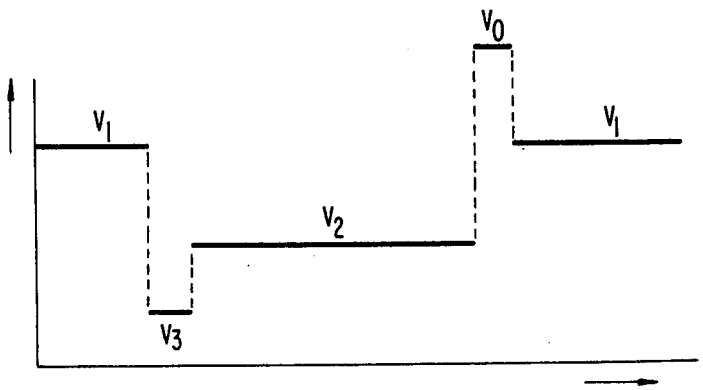

If the take-up speed is changed directly from $V_1$ to $V_2$ as shown in FIG. 2, the thickness of resin tube obtained is varied very slowly, as shown in FIG. 3. The transition from the thin wall (t) to the thick wall (T) takes place gradually to provide a relatively long distance between points (b) and (c). However, it is desirable that the transition takes place rapidly to provide a short distance, such as that shown between points (g) and (h) in FIG. 4. Generally, the greater the difference of width between the openings B and A, the greater the distance between points b and c in FIG. 3. Conversely, when transition from the thick wall (T) to the thin wall (t) takes place, variation thereof occurs very rapidly as shown at (e) in FIG. 3. Thus, substantially equal transition portions, g–h and i–j, as shown in FIG. 4 cannot be achieved without employing some additional technique. On such technique is to provide several stages in addition to the high speed $V_1$ and the low speed $V_2$. For example, as shown in FIG. 5, when the speed is shifted from the high speed $V_1$ to the low speed $V_2$, a lower speed $V_3$ is first employed. This causes the large width opening to fill faster. Also, when the speed is shifted from the low speed $V_2$ to the high speed $V_1$, a higher speed $V_0$ is employed first as shown. In this manner, a resin tube formed with a predetermined inclination may be obtained, as shown in FIG. 4, regardless of whether the change is from thin wall to thick wall or vice versa.

In actual use it is preferable to further subdivide the speeds $V_3$ and $V_0$ into several stages as shown in FIG. 6. As shown there, the lowest speed $V_3$ is divided into four stages $V_{31}$ through $V_{34}$. Also, in order to change the speed from the low speed $V_2$ to the high speed $V_1$, the speed is changed from $V_{01}$ up to $V_{03}$ through $V_{02}$ and rapidly dropped from $V_{03}$ to $V_1$, resulting in a state wherein the speed is elevated from the low speed $V_2$ to the high speed $V_1$.

In the embodiment illustrated in FIG. 1, the inner die 2 side is cut at the tip of the orifice to form the large-width tubular opening B thereat. However, the die whose side is cut to provide the large-width tubular opening B is not limited to the inner die 2. The large-width tubular opening B may also be formed by cutting the tip 11 of the outer die 1 as shown in FIG. 7. In this case, an externally raised thick portion is formed. In this case, therefore, the inside diameter control device 3 for a resin tube is positioned adjacent the orifice. Similarly to the case as illustrated in FIG. 1, the inside diameter control device 3 has the grooves 4 formed externally thereof to intake air therethrough, and a coolant is circulated internally of the device 3. Also, similar to the embodiment of FIG. 1, the resin tube has its inside diameter controlled by the device 3, cooled in the water vessel 5, and pulled by the take-up machine 6 at different speeds such as the high speed $V_1$ and low speed $V_2$. In this manner, a resin tube severally provided with externally raised thick portions may be obtained.

Resin tubes obtained by the apparatus according to the present invention are suitable for use as follows: For example, as shown in FIG. 8 (a), the resin tube is cut off so that the thick wall portion thereof may assume the extreme end position, and the thick wall portion is heated to be softened to enlarge the inside diameter thereof and to place therein a connecting sleeve as shown in FIG. 8 (b). With this arrangement, the resin tubes obtained by the present invention possess various advantages. In conventional resin tubes having the same thickness throughout the length thereof, if the inside diameter of a tube is enlarged, the enlarged portion becomes thin to thereby reduce the strength of the enlarged portion, whereas in those resin tubes obtained by the present invention, the resin tubes are originally thick so that the strength reduction thereof is minimized. Accordingly, the resin tubes obtained by the present invention are suitable for providing an enlarged inside diameter portion used for connecting tubes with each other. Also, the resin tubes of the invention are suited for use wherein the thick wall portion is heated to be softened, to which a flange is attached.

A significant feature of this invention resides in the provision of the large-width tubular opening B in addition to the small-width tubular opening A at the tip of the orifice. The details of these openings A and B will be supplemented in the following description.

As previously described, either outer die 1 or inner die 2 may be cut to form the large-width tubular opening B at the nose of the small-width tubular opening A within the orifice. In the illustrated embodiment, the shape of the cut-off portion appears in the form of a rectangle in cross section. However, the shape of the cut-off portion is not limited to rectangular. For example, it may also be designed, as shown in FIG. 9 (a), that the tip of the inner die 2 is cut into a triangle in cross-section so that the inner wall surface of the large-width tubular opening is inclined. Similarly, the tip of the outer die 1 may be cut into a triangle in section as shown in FIG. 9 (b), so that the outer wall surface of the large-width tubular opening B may be inclined. It may further be designed, as shown in FIG. 9 (c), so that both the outer die 1 and inner die 2 are cut so that both the inner and outer wall surfaces of the large-width tubular opening B are inclined so as to have a wider tip. Also both the inner and outer dies may be cut into a rectangular cross-section, as shown in FIG. 9 (d).

The relation in size between the small-width tubular opening A and the large-width tubular opening B is preferably determined in a manner as noted below.

Generally stated, the orifice used for manufacturing a resin tube is designed so that, as shown in FIG. 10, the inner die 2 is positioned within the outer die 1, and the resultant elements are fixed to each other by a bridge 9 to form tubular openings between the dies. The tubular openings may sometimes be bent within the orifice, but normally have substantially the same width in the vicinity of the resin discharge end. Positioned at the tip of the small width opening A is the large-width tubular opening B.

The width of the opening B is represented by Y, and the length of the opening B along the flow of resin is represented by n. Preferably, the length n is slightly shorter than the length of a shoulder portion of the resin tube from the thin wall portion toward the thick wall portion. Preferably, the width Y is nearly equal to the thickness T of the thick wall portion in a resin tube to be obtained.

All resins having a thermoplastic property can be used in the manufacture of tubes according to the present invention. The preferred resins are rigid vinyl chloride resin.

While the invention has been described in detail and with reference to specific embodiments thereof, it will be apparent to one skilled in the art that various changes and modifications can be made therein without departing from the spirit and scope thereof.

What is claimed is:

1. Apparatus for manufacturing resin tubes alternately having a thick wall portion and a thin wall portion in the same tube, and comprising: a fixed inner die and a fixed outer die together forming an orifice at the tip of an extruding machine of the type which extrudes resin at substantially a uniform speed; said orifice defining a fixed tubular opening at the extreme end of the extruding machine for forming said resin into a tube-like member, said tubular opening being divided into at least two stages along the direction of movement of said resin, one of said stages being a fixed small-width opening portion in the resin inlet part of said orifice and the second of said stages being a fixed large-width opening portion at the resin outlet part of said orifice, said large-width opening porion having an end portion open to the orifice; diameter control means in close contact with said tip surface for controlling one of the outside and inside diameters of the resin tube to be extruded; and pulling means, downstream of said orifice, for pulling said resin at high and low speeds respectively to cause said resin being extruded to fill only said small-width opening at said high speed and to fill both said small-width opening and at least the open end portion of the large-width opening at said low speed.

2. Apparatus as claimed in claim 1, wherein said pulling means further comprises means for pulling said resin at change over speeds between said high and low speeds, said change over speeds when going from said low speed to said high speed being higher than said high speed and being carried out in steps which increase the speed and then drop the speed down to said high speed, and said change over speeds when going from said high speed to said low speed being lower than said low speed and being carried out in steps increasing the speed up to said low speed.

3. Apparatus as claimed in claim 1, wherein said control means is operatively associated with said inner die for controlling the inside diameter of the tube-like member and the outer die is cut to provide said large-width opening portion, whereby tube-like members having externally raised thick portions are obtained.

4. Apparatus as claimed in claim 1, wherein said control means is operatively associated with said outer die for controlling the outer diameter of the tube-like member and the inner die is cut to provide said large-width opening portion, whereby tube-like members having internally raised thick portions are obtained.

* * * * *

UNITED STATES PATENT AND TRADEMARK OFFICE
CERTIFICATE OF CORRECTION

PATENT NO. : 4,135,871
DATED : January 23, 1979
INVENTOR(S) : Sadao MURAI et al

It is certified that error appears in the above–identified patent and that said Letters Patent are hereby corrected as shown below:

IN THE HEADING:

Foreign Application Priority Data:

delete "Sep. 24, 1975" insert -- Sep. 24, 1974 --

Signed and Sealed this

Twenty-ninth Day of April 1980

[SEAL]

Attest:

SIDNEY A. DIAMOND

Attesting Officer     Commissioner of Patents and Trademarks